US006046751A

United States Patent [19]

Kato et al.

[11] Patent Number: 6,046,751

[45] Date of Patent: Apr. 4, 2000

[54] COLOR GRAPHICS PROCESSOR

[75] Inventors: Shuhei Kato; Koichi Sano, both of Kusatsu, Japan

[73] Assignee: SSD Company Limited, Kusatsu, Japan

[21] Appl. No.: 09/019,260

[22] Filed: Feb. 5, 1998

[30] Foreign Application Priority Data

Feb. 10, 1997 [JP] Japan .................................... 9-041651
Apr. 22, 1997 [JP] Japan .................................... 9-120199

[51] Int. Cl.[7] ...................................................... G06T 1/00

[52] U.S. Cl. ........................................... 345/501; 345/507

[58] Field of Search ........................... 345/501, 507–509, 345/515, 192, 193, 196, 521, 213, 422

[56] References Cited

U.S. PATENT DOCUMENTS

| | | | |
|---|---|---|---|
| 4,808,988 | 2/1989 | Burke et al. | 345/16 |
| 5,251,298 | 10/1993 | Nally | 395/515 |
| 5,355,146 | 10/1994 | Chiu et al. | 345/156 |
| 5,526,050 | 6/1996 | King et al. | 348/387 |
| 5,835,783 | 11/1998 | Grimsrud | 710/8 |

*Primary Examiner*—Kee M. Tung

[57] ABSTRACT

A color graphic processor generating a picture screen formed by a two-dimensional pixel array for a raster-scan display. The color graphic processor comprises a scan image generator and a color video encoder. A circular pixel buffer having a plurality of pixel buffer units is used to buffer pixel data for drawing and displaying. The pixel buffer unit storing the pixel information of a current scanning position is circularly reused after the scanning position moves to the next one. The number of pixel buffer unit is flexible and does not have to be the same as the number of pixels in a horizontal scan line. A transparent information storage means and a transparent controller are included to reduce the size of the pixel buffer and control transparent pixels. The color video encoder processes digital luminosity, saturation and hue signals according to a video sync signal and a color burst flag signal to generate a digital luminosity signal and a digital chromaticity signal. The two video signals are combined to form a composite video signal. Digital-to-analog converter converts the digital video signals to analog video signals. The color video encoder supports both NTSC and PAL standard.

12 Claims, 8 Drawing Sheets

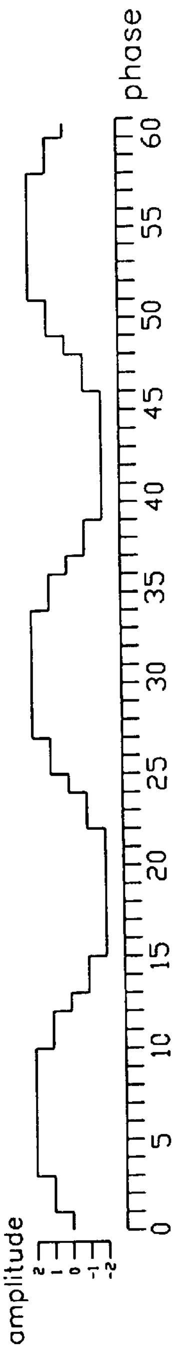
FIG. 7
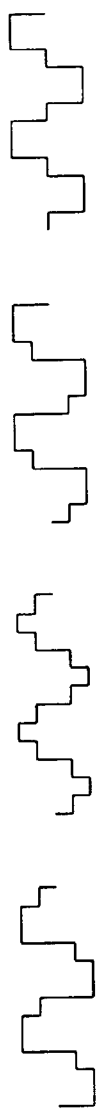
FIG. 8 (NTSC)
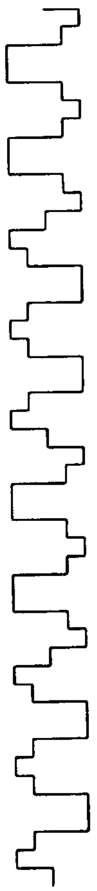
FIG. 9 (PAL)

COLOR GRAPHICS PROCESSOR

BACKGROUND OF THE INVENTION

1. Field of the Invention

This invention relates to a color graphics processor for raster-scan display, and more specifically to the scan image generator and the color video encoder of the color graphics processor for processing graphic transactions and encoding composite color video signals for color video display devices, such as entertainment devices (video game machines), education aids, communication equipment, measure equipment, check equipment, advertisement equipment, KARAOKE machines, word processor, video editor, driver aids, printing aids, music aids, exercise aids, handicapped aids and so on.

2. Prior Art Description

A raster scan image generator and a color video encoder are two essential parts of a color graphic processor that outputs images to a raster-scan video display. The efficiency and the accuracy of generating raster scan images as well as encoding video signals determine not only the quality of displayed graphics but also the performance that can be provided by a color graphics processor for a raster-scan display.

Conventionally, there are several methods for generating graphics for a raster-scan display. One of the simplest methods is that graphic data are directly read from memory and displayed on a display device simultaneously without using any extra buffers. An example of using this method is a simple character display screen used in a personal computer or workstation.

A scan image generator for this method can be implemented with a simple and small circuit. However, there are several limitations in such a scan image generator. One clear limitation is that characters must be located along the grid of a character size so that no character can overlay others.

Another conventional method for generating raster-scan images is called scan line buffer method that uses scan line buffers. In a scan line buffer method, the image are segmented into horizontal lines. Typically, this method is further categorized as either a single scan line buffer method or a double scan line buffer method.

In a single scan line buffer method, a buffer is provided for storing the information of one horizontal scan line. In general, a horizontal scan line is drawn into the buffer during a horizontal blanking period to avoid the interference between drawing and displaying. An example of using this method is the motion picture (called Sprite) generator in Super Famicom®.

In an ordinary raster-scan display, the time for drawing can take only one third of the time for displaying. Therefore, the performance of drawing in a single scan line buffer method is greatly limited.

In a double scan line buffer method, two buffers are provided for respectively storing information of one horizontal scan line. One buffer for drawing a scan line image and the other buffer for displaying the image on a screen are alternately switched during each horizontal blanking period. An example of using this method is the motion picture generators in arcade video game machines.

Compared with the single scan line buffer method, this method has longer time for drawing and, thus, the performance of drawing is better. However, the size of the required memory is twice of that in the single scan line buffer method.

Another conventional method using a memory buffer is a frame buffer method. This method can be used to support the application of a bit map display. The frame buffer method can further be divided into two methods. One is called single frame buffer method and the other is called double frame buffer method.

In the single frame buffer method, a buffer is provided for storing the information of one video frame. An example of using this method is graphics display processors used in personal computers or workstations. This method has the advantage that a whole frame of image can be drawn without scanning the image line by line. Nonetheless, the drawing process is also displayed because drawing is done while the image is being displayed. In addition, the size of the required memory for the frame buffer is large.

In contrast to the single frame buffer method, two frame buffers are provided in the double frame buffer method for respectively storing the information of one video frame. A buffer for drawing a video frame image and the other buffer for displaying the image on a screen are alternately switched during a vertical blanking period. An example of using this method is graphics generators used in graphic workstations and 3-dimentional video game machines.

Compared with the single frame buffer method, the double frame buffer method provides better quality for the graphics on a screen because it avoids displaying the drawing process. However, the size of the required memory is very large.

In some existing video game machines such as Family Computer® and Super Famicom®, a screen image consists of many graphic characters. And data of each character consists of character pattern data (such as pixel array data) and character attribute data (such as character format, color palette and so on). Character pattern data and character attribute data are managed independently.

In spite of the fact that many character data use one fixed character attribute data, they must be managed independently. This method makes the software design more complicated and it is not a good policy either from the viewpoint of software performance and memory utilization.

Traditionally, there are two methods for pointing to character data. One is character number method and the other is address pointer method. The character number method has an individual character number for each block of character data. Generally, the size of every block is limited to one unified size. The address pointer method uses an absolute address pointer and/or an offset address pointer. The size of every block is not limited.

The character number method has two advantages. One is that each character number represents an individual character that allows more efficient CPU transaction and also better memory utilization. The other is that the fixed size of each character makes it easier for CPU to calculate pixels for update pixel data directly. The address pointer method, on the other hand, had the advantage that the size of each block is not limited.

From the above discussion, there is a need for a simple and efficient mechanism that can generate high quality scan images for a color graphics processor. To reduce the cost of a graphics processor, it is also important that the size of the buffer memory for storing pixel information should be small.

The other important part of a color graphics processor is the color video encoder. FIG. 1 shows a conventional color video encoder as disclosed in Japan Patent No. 2-50477. In the color video encoder, the color sub-carrier is represented by a two-level signal such as a square wave. It is called a two-value selective color video encoder. The color video encoder comprises a phase signal generator 101, a level signal generator 102, a phase signal selector 103, a color code signal generator 104 and a color signal output device 105.

The phase signal generator 101 generates a plurality of phase signals whose frequency equals to that of a color sub-carrier signal. The phase difference between two adjacent phase signals is identical. The level signal generator 102 generates a plurality of level signals having different voltage levels. Each two adjacent level signals have identical voltage difference. The color code signal generator 104 generates a color code signal consisting of a hue select code and a level select code.

The phase signal selector 103 selects one phase signal among the plural phase signals according to the hue select code. The color signal output device 105 selects a pair of the level signals according to the level select code. The amplitude of the selected phase signal is modulated between the selected pair of voltage levels to generate a composite video signal as the video output signal.

The two-value selective color encoder requires only a small and simple circuit. It can be constructed on a single semiconductor chip. However, the generated color variation of the encoder is poor and the interference between chrominance and luminance is difficult to avoid.

Two kinds of video encoders are available. One is an analog video encoder, and the other is a digital video encoder. An analog video encoder comprises a color sub-carrier generator for generating two color sub-carrier wave signals. The two signals are similar except that one is 90 degree phase shifted from the other. The analog video encoder also has a matrix means for converting color space from RGB signals to a luminosity signal (Y) and color difference signals (R-Y and B-Y) that are orthogonal to each other.

In the analog video encoder, there are two multipliers for multiplying color sub-carrier wave signals and color difference signal. One multiplies a color sub-carrier wave signal with the color difference signal (R-Y) and the other multiplies the shifted color sub-carrier wave signal with the color difference signal (B-Y). The two output signals from the multipliers are mixed by a first mixer to generate a chrominacity signal. A second mixer then mixes the luminosity signal with the chromaticity signal to generate a composite video signal.

An analog video encoder has several advantages. It has a relatively simple analog circuit and can generate rich color variations easily. The characteristic of Y/C (luminosity/chromaticity) is also good. However, the analog circuit is difficult to be fabricated on a single semiconductor chip. In addition, the output video signal is an analog signal that is subject to noise. Furthermore, an analog video encoder for NTSC standard can not be made compatible with one for PAL standard without replacing an oscillator and vice versa.

A digital video encoder is accomplished by replacing the analog circuit in the analog video encoder with a digital circuit. The input signal to a digital video encoder is digital. In the digital video encoder, a product-sum calculator is used instead of a matrix means for the color space conversion. The color sub-carrier generator is replaced by a digital circuit employing ROM that stores sine waveform table to generate 2 sets of digital color sub-carrier wave signals having 90 degree phase difference between each other. Digital multipliers replace the analog multipliers and digital adders replace the mixers. Finally, the digital signals are converted to analog video signals through DAC (digital to analog converter).

In general, a digital video encoder can generate rich color variations. The signals are more immune to noise. Digital filters can be used to cancel the interference between chrominance and luminance. The signal generated can be very accurate and has high resolution. A video encoder for NTSC standard can be compatible with one for PAL standard without replacing an oscillator. In addition, trimming of an oscillator's frequency is usually not necessary. However, the disadvantage is that the circuit is typically large and complicated.

SUMMARY OF THE INVENTION

The present invention has been made to satisfy the need for a simple and efficient scan signal generator as well as to overcome the drawback of a conventional video encoder for a color graphics processor. Improvements and novel design have been employed in this invention to provide a more efficient and powerful graphics processor.

The first object of this invention is to provide a color graphics processor with a simple architecture for reducing the buffer size and increasing the efficiency of memory utilization.

According to this invention, the color graphics processor comprises a plurality of pixel buffer units that are arranged as a circular buffer. The size of a pixel buffer unit can be independent of the size of a horizontal scan line and is much smaller compared to a conventional frame buffer. In addition, the pixel buffer units are always available for drawing except when they are used for displaying and initialization. Memory utilization is therefore more efficient.

In the circular buffer, the pixel buffer unit that stores the information of the current scanning position is considered the tail end. Other pixel buffer units store sequentially the information of pixels of scanning positions that follow the current position along the raster-scan direction. The buffer is arranged in a circular fashion. As the scanning position moves, the pixel buffer unit for the previous scanning position is recycled and reused to store information of a later scanning position.

Another object of this invention is to provide an efficient display priority control function for stacked graphic objects. In the present invention, all graphic objects have their own depth information and each pixel buffer unit comprises a color code buffer and a depth buffer. The display priority is controlled pixel by pixel. Therefore, it is easy to control the display priority of each object individually.

It is also an object of this invention to provide an access arbitrator for arbitrating the access of the pixel buffer units in the color graphics processor between drawing and output functions. The access arbitrator of this invention allows the use of a relatively simple control circuit for the pixel buffer unit.

In a color graphics processor, a palette means is usually used for converting a pixel color code to pixel color information to be displayed. A transparent color function determines if a pixel is transparent or not. If the color code conversion is done before storing the pixels into a pixel buffer unit and the transparent color function is controlled by the palette means, the size of the pixel buffer unit would be very large because pixel color information instead of the pixel code has to be stored.

Accordingly, another object of this invention is that the color graphics processor further provides a transparent information storage means and a transparent control means for controlling the transparent color of a pixel. This makes it possible to do the color code conversion using the palette means after the stage of storing the pixels into a pixel buffer unit. Thus, the size of the pixel buffer unit does not need to be increased.

This invention also provides a buffer access accelerator for the access of the pixel buffer unit. If the pixel buffer unit is constructed from random access memory (RAM), the accelerator ensures that one operation cycle consists of only three steps including pre-charging, reading and writing when the pixel buffer unit is accessed.

Yet another object of this invention is to provide a character data structure comprising a character header as well as a character pattern having a two-dimensional pixel array. The character header includes more than one set of character attribute data for characterizing the character pattern data. This gives more flexibility such as displaying plural formats of characters together. It also avoids the drawback of managing character pattern data and character attribute data separately as typically done in a conventional method.

Because the character pattern data block of the character data structure in the present invention has variable size, an address pointer method is more appropriate for pointing to character pattern data block. Nevertheless, the traditional character number method has the advantage of being more efficient. To satisfy the requirement that the number of bits used for the character pointer has to be variable due to the variable character pattern block size, this invention uses selectable character pointer format. The invention further provides a character pointer format converter for converting character pointers in different formats to character pointers in a unified format according to the information of a character pointer format.

Another object of this invention is to provide a digital color video encoder that is capable of generating rich color variation and canceling interference between chriominance and luminance, and can be implemented with a simple circuit. Furthermore, it is also an object of the present invention to provide a color video encoder that can generates Y/C (luminosity/chromaticity) signals conforming to the S-video standard.

BRIEF DESCRIPTION OF THE DRAWINGS

FIG. 7 illustrates the conversion table implemented by a ROM table in the phase-to-amplitude converter.

FIG. 8 shows the waveform of the modulated digital amplitude signal in NTSC standard.

FIG. 9 shows the waveform of the modulated digital amplitude signal in PAL standard.

DETAILED DESCRIPTION OF THE PREFERRED EMBODIMENTS

Figure 1:
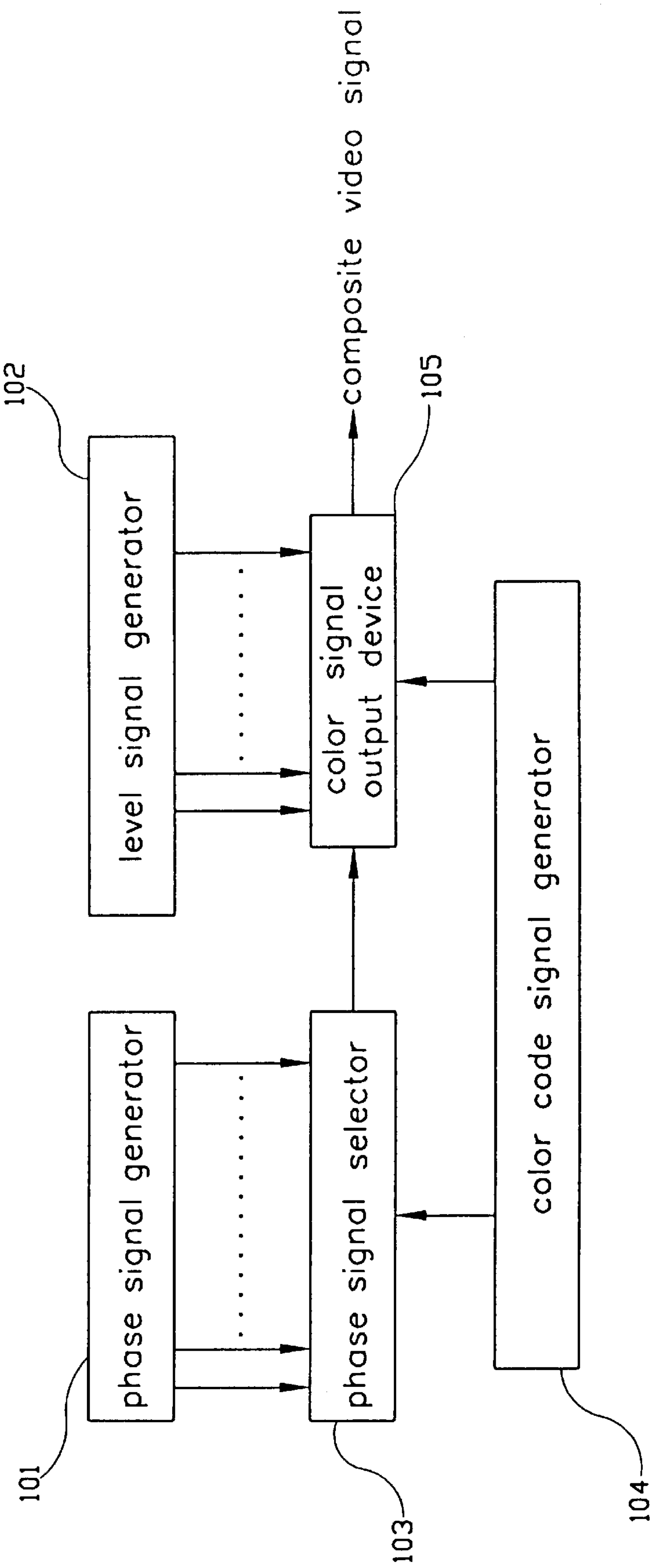
(PRIOR ART) FIG.1
FIG. 1 is the block diagram of a conventional color video encoder as disclosed in Japan Patent No. 2-50477.
Figure 2:
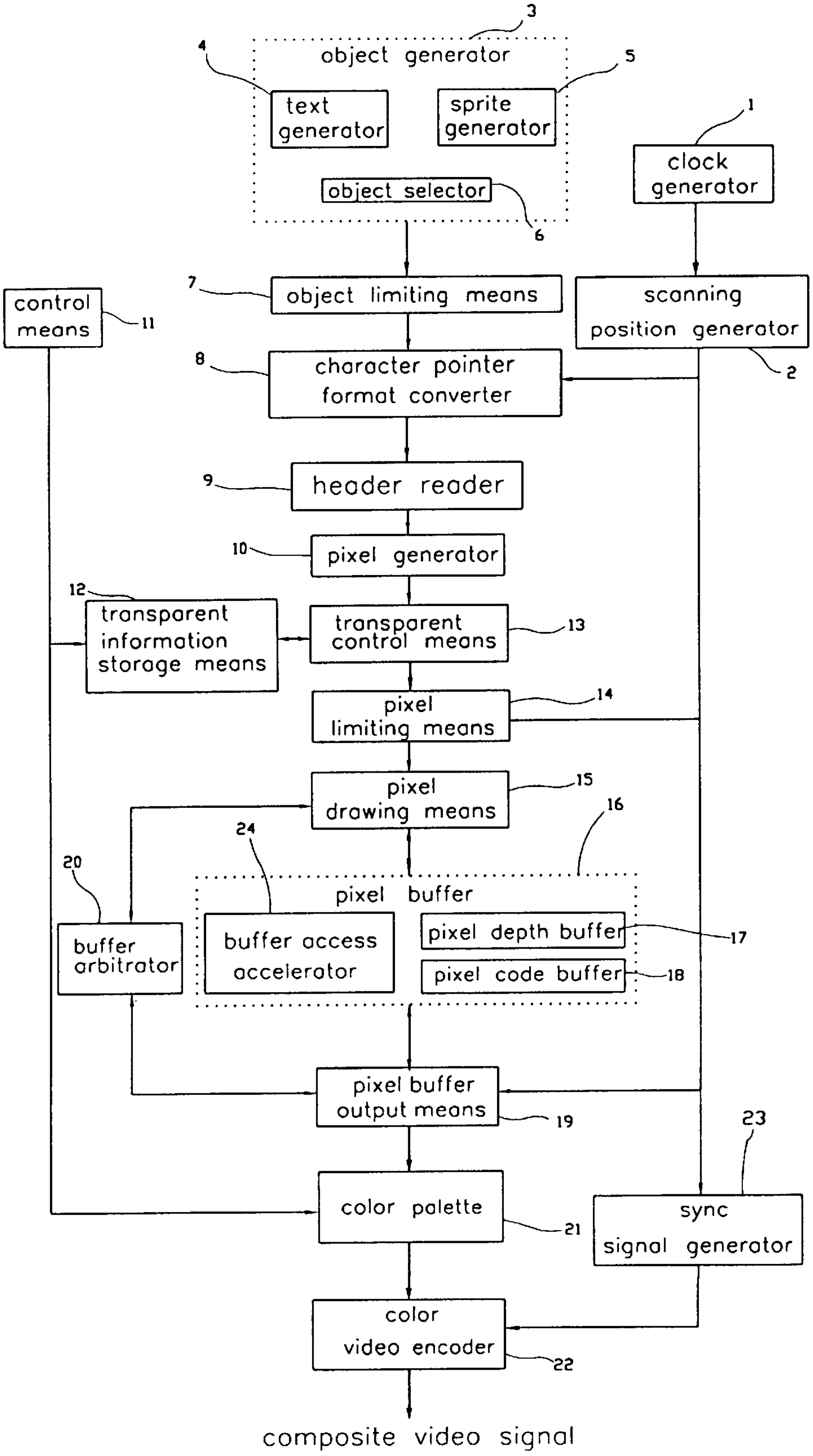
FIG. 2 is the block diagram illustrating the basic structure of the color graphics processor according to the present invention.

With reference to FIG. 2, the color graphic processor of this invention comprises several functional blocks for accomplishing the task of generating a screen of color picture composed of a two-dimensional pixel array. The theory and the function of each block shown in FIG. 2 are described as follows.

The color graphic processor comprises a clock generator 1 for generating a clock signal. Many different types of conventional square wave oscillators can be used as the clock generator 1. The clock signal can also be generated from a separate and independent circuit.

A scanning position generator 2 generates a scanning position for a raster-scan display using the clock signal. The information of the horizontal scanning position is repeatedly generated along the horizontal scanning direction of the raster-scan display. It also generates information of the vertical scanning position in the vertical direction. The scanning position generator 2 has both horizontal and vertical counters. In addition, the scanning position generator 2 may generate scanning position only for display area except horizontal and vertical blanking period.

The color graphics processor also includes an object generator 3 comprising a text generator 4, a sprite generator 5 and an object selector 6. The object selector selects either a text character or a sprite character as the object to be processed The object may have parameters for rotation and zooming. In addition to characters of text screens and sprites, the object generator 3 also can generate geometric patterns such as lines, polygons, arcs and points.

Shape and position of a polygon are fixed by coordinates of its vertexes. The depth value (Z-vector) of each pixel can be complemented by the depth value of vertexes. A polygon can also be filled with a fixed color or attached with a texture. When attaching a texture to a polygon, a pixel color code can be generated by computing the relative pixel location in the texture and then reading the corresponding color code in the texture data.

One advantage of having an object generator is that a picture screen can be represented by only definitions of objects instead of pixel data. The loading to a control unit such as CPU can be greatly reduced.

In a traditional method used in Family Computer® and Super Famicom®, the display priority order of sprites is determined by the order of the parameter of the sprite stored in the sprite memory. In this traditional method, changing the display priority of sprites requires a heavy loading to the CPU. For example, when one sprite is assigned with certain priority level, all parameters of sprites having lower priority level than this sprite must be reordered.

In the scan image generator according to the present invention, all graphic objects such as characters of text screens and sprites have their own depth information and a pixel buffer 16 comprises both color code buffers and pixel depth buffers for storing this information. The pixel drawing means 15 controls the display priority pixel by pixel according to pixel depth values. Therefore, it is easy to control the display priority of each object individually.

The object generated by the object generator 3 is sent to an object limiting means 7. Based on the scanning position generated by the scanning position generator 2 and position of the object, the object limiting means 7 determines if the object overlaps with a portion of the picture screen corresponding to the current position of the pixel buffer 16. It only outputs objects that have overlap for further processing.

Because the performance of drawing into the pixel buffer 16 has a physical limitation, the drawing may easily overflow the pixel buffer 16 if all objects are presented to the buffer. It is desirable that the pixel buffer only stores pixel information for a small portion of the whole picture screen. The object limiting means 7 ensures that objects that are not in the area corresponding to the pixel buffer 16 are not written to the buffer. Therefore, the pixel buffer is more efficiently used and more objects can be displayed on the picture screen.

In conventional graphics processors employed in Family Computer®, Super Famicom® and so on, character pattern data and character attribute data are managed separately. In general, the number of bytes of one character pattern data block is some power of 2. Therefore, it is convenient for address calculation to manage them separately.

In general, character attribute data includes information such as the number of bits per pixel, the character size, the palette select code, the flip control code and so on. In the conventional graphics processors, character attribute data are stored in RAM (random access memory) area so that they can be changed. In some existing systems, some character attribute data are fixed or controlled by control registers. In such cases, it is impossible that plural formats of characters are displayed together.

In practice, however, some character attribute data such as the number of bits per pixel and the character size are specific to respective character pattern data. It is unlikely that one character pattern data takes several selective values of them. Moreover, in actual applications, some character takes only one value for the palette select code or the flip control code.

In the system according to the present invention character pattern data and character header including character attribute may be stored consecutively. Only pointing to one of character header data can specify not only the character attribute data but also the character pattern data.

One advantage is that the system may reduce RAM capacity needed for storing character attribute data. Another advantage is the system can reduce the size of program and the loading for host CPU. That is because only pointing to one of character header data can specify the character data. In addition, several formats of character data can be displayed together.

The output of the object limiting means 7 is sent to a character pointer format converter 8. The format converter converts character pointers in various formats to character pointers in a unified format according to the formats of the character pointers. The output of the character pointer format converter 8 is a character pointer pointing to a character data structure that includes a character header and a character pattern data block of variable size.

The character pointer format converter 8 may convert the following formats:

i.) Absolute address pointer;

ii.) Relative address pointer using base address register, segment or paging method;

iii.) Indirect address pointer;

iv.) Address pointer having alignment of character data block; and v.) Character number aligned according to character block size.

The output of the character pointer format converter 8 is sent to a header reader 9. The header reader 9 reads character attribute data according to the character pointer converted by the character pointer format converter 8. The header reader also converts the pointer for pointing character data structure to a pointer for pointing character pattern data. The output of the header reader is the read character attribute data and the character pointer pointing to character pattern data.

The output of the header reader 9 is sent to a pixel generator 10. The pixel generator fetches character pattern data and decomposes it into pixel data. The output of the pixel generator is pixel data including a pixel color code, a pixel depth value and position of the pixel.

The color graphics processor also comprises a control means 11, a transparent information storage means 12 and a transparent control means 13. A host CPU may substitute the control means 11.

On the screen, a pixel having a transparent color is invisible and the color of the pixel behind it is shown. Therefore, transparent color must be interchanged with the color of the pixel behind. If the transparent color appears at the stage of output from the pixel buffer 16, it is too late to know that the color should be interchanged. Therefore, the pixel colored by transparent color must be identified before it is drawn into the pixel buffer 16. In this invention, the transparent is treated as one of the colors in a color palette 21.

The color palette 21 stores color information for all color codes. It converts a pixel color code to color information of the pixel. The control means 11 writes color information for each color code into the color palette. If a written color information is a transparent color, the transparent information storage means 12 stores the color palette address. The transparent control means 13 determines if a pixel color code generated by the pixel generator 10 is a transparent color or not according to the color palette address stored in the transparent information storage means 12. Only pixels that are not transparent are sent to a pixel limiting means 14.

The pixel limiting means 14 determines if its input pixel information overlaps with the portion of the display screen corresponding to the current position of the pixel buffer 16. Only pixel information that overlap are sent to the pixel drawing means 15.

The pixel buffer 16 comprises a pixel depth buffer 17 and a pixel code buffer 18. According to the scanning position generated by the scanning position generator 2 and the position of the pixel sent from the pixel limiting means 14, the pixel drawing means 15 accesses the pixel buffer 16. The pixel depth value read from pixel buffer 16 is compared with that of the sent pixel. According to the compared result, the pixel color code and the pixel depth value in the buffers are updated with those values of the sent pixel.

Figure 3:
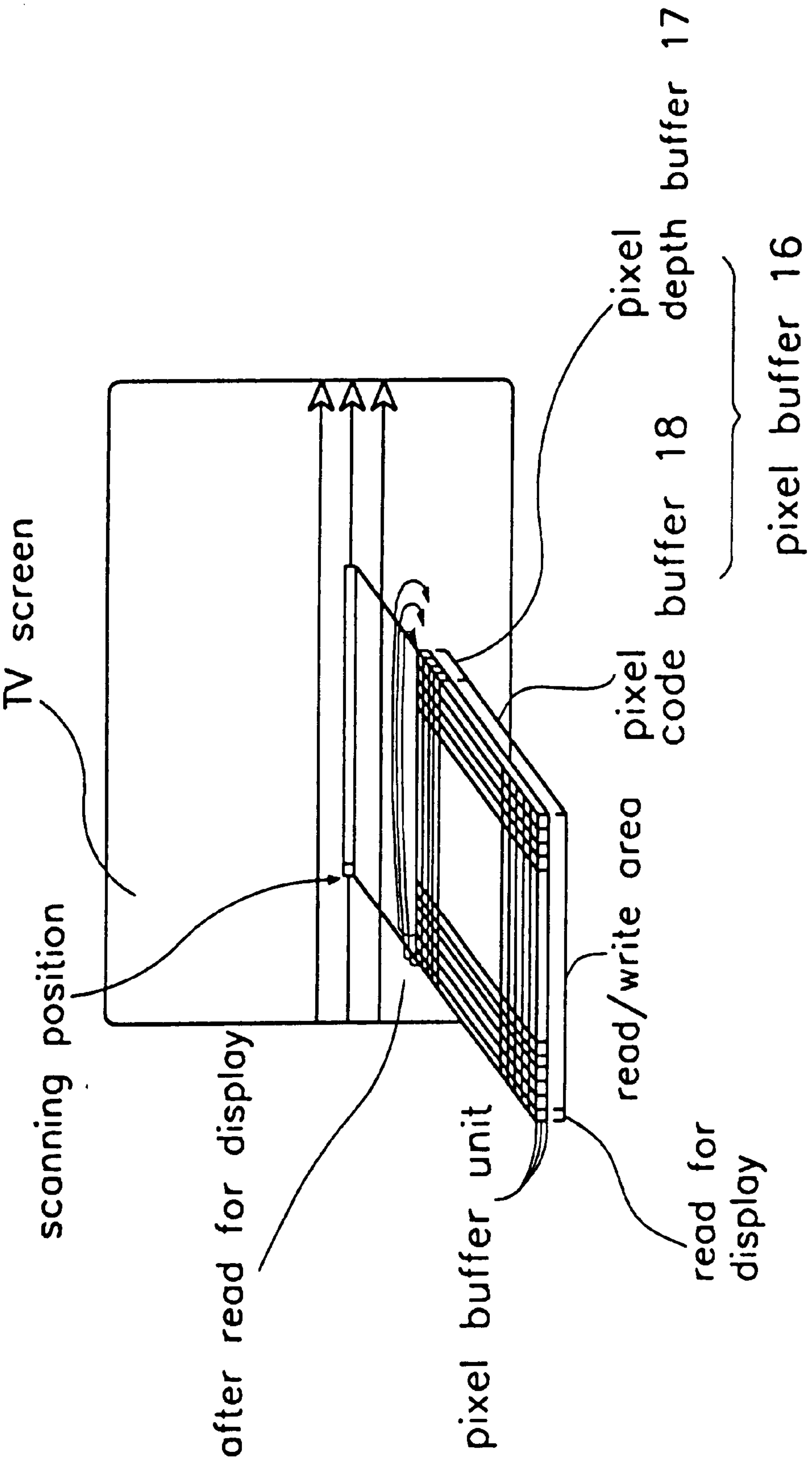
FIG. 3 illustrates the schematic diagram and the operation of the pixel buffer for the color graphics processor of the present invention.

FIG. 3 illustrates the structure of the pixel buffer comprising a plurality of pixel buffer units. The number of pixel buffer units has no limitation. As shown in FIG. 3, it can be less than the number of pixels in a horizontal scan line. Each pixel buffer unit has a pixel depth buffer unit and a pixel code buffer unit. The pixel buffer is arranged as a circular buffer. The pixel buffer unit storing the pixel information of the current scanning position is regarded as the tail end. The information of pixels following the current scanning positions is stored sequentially in the remaining pixel buffer units. When the scanning position moves for a pixel, the pixel buffer unit storing the pixel information of the previous scanning position is reused for storing the newly ranged pixel information as shown in FIG. 3.

The pixel depth buffer 17 and the pixel code buffer 18 can be implemented by widely used RAM integrated circuits such as dual-port video memory that has both serial access ports and parallel access ports. When drawing into the buffer, the video memory is accessed through the parallel access port. When displaying the content of the buffer, the serial access port is used. An arbitrator usually exists in the dual-port video memory for arbitrating the access.

According to this invention the number of pixel buffer units can be independent of the number of pixels in a horizontal line or pixels in a video frame. Consequently, it results in better optimization of the size of the pixel buffer. For example, in the single scan line buffer method, if the number of pixels in a horizontal line is 320, the number of pixels in the buffer must be 320. Using semiconductor memory devices to implementing this number is not convenient because certain powers of 2 are usually used for digital memory address space.

According to the structure of the pixel buffer in the present invention, the number of the pixel buffer units can be designed according to the desired performance of drawing. It is desirable that pixel buffer stores pixel information for a small portion of a whole picture screen.

A pixel buffer output means 19 reads the pixel color code of the scanning position sent from the scanning position generator 2. It also clears the content of the pixel buffer unit after reading it.

Both the pixel drawing means 15 and the pixel buffer output means 19 may request the access of the pixel buffer 16. In order to arbitrate the access of the pixel buffer 16 between the pixel drawing means 15 and the pixel buffer output means 19, the color graphics processor also has a buffer arbitrator 20. Because of the structure of the pixel buffer 16, conventional approach of separating the buffer into two parts, one for drawings and the other for displaying is not appropriate. A simple approach to the arbitration is that the arbitrator 20 allows the pixel drawing means 15 or the pixel buffer output means 19 to access the pixel buffer 16 in time sharing method.

The color palette 21 is used in the color graphics processor for converting the pixel color code sent from the pixel buffer output means 19 to color information of the pixel. A sync signal generator 23 generates sync timing signals for a color video encoder 22 according to the scanning position information from the scanning position generator 2. In addition, a video signal generator 22 combines the output of the color palette means 21 with the sync timing signal and forms a composite video signal.

For cost minimization, the pixel buffer 16 should be implemented by using RAM. In this case, pre-charge operation is necessary for every access. A buffer access accelerator 24 speeds up the access of pixel buffer 16. The read and write of memory of a same address is accomplished in three cycles including pre-charge, read-out, comparison and write-in by the buffer access accelerator.

One operation cycle executed by the pixel drawing means 15 includes pre-charging, reading a pixel depth value from the target pixel buffer unit, and writing the new pixel color code and the new pixel depth value into the same pixel buffer unit if the new pixel depth value is larger than the read pixel depth value. The operation cycle executed by the pixel buffer output means 19 includes pre-charging, reading the pixel color code from a target pixel buffer unit for display, and writing initial values into the pixel code buffer and the depth value buffer of the same pixel buffer unit. Thus, one operation cycle for the pixel buffer always includes three cycles and read address and write address are identical."

Using the color palette 21 can reduce the size of the pixel buffer because only pixel color codes have to be stored in the pixel buffer. In addition, changing the colors can be accomplished by updating pixel color information in the color palette without updating the character pattern data directly.

Figure 4:
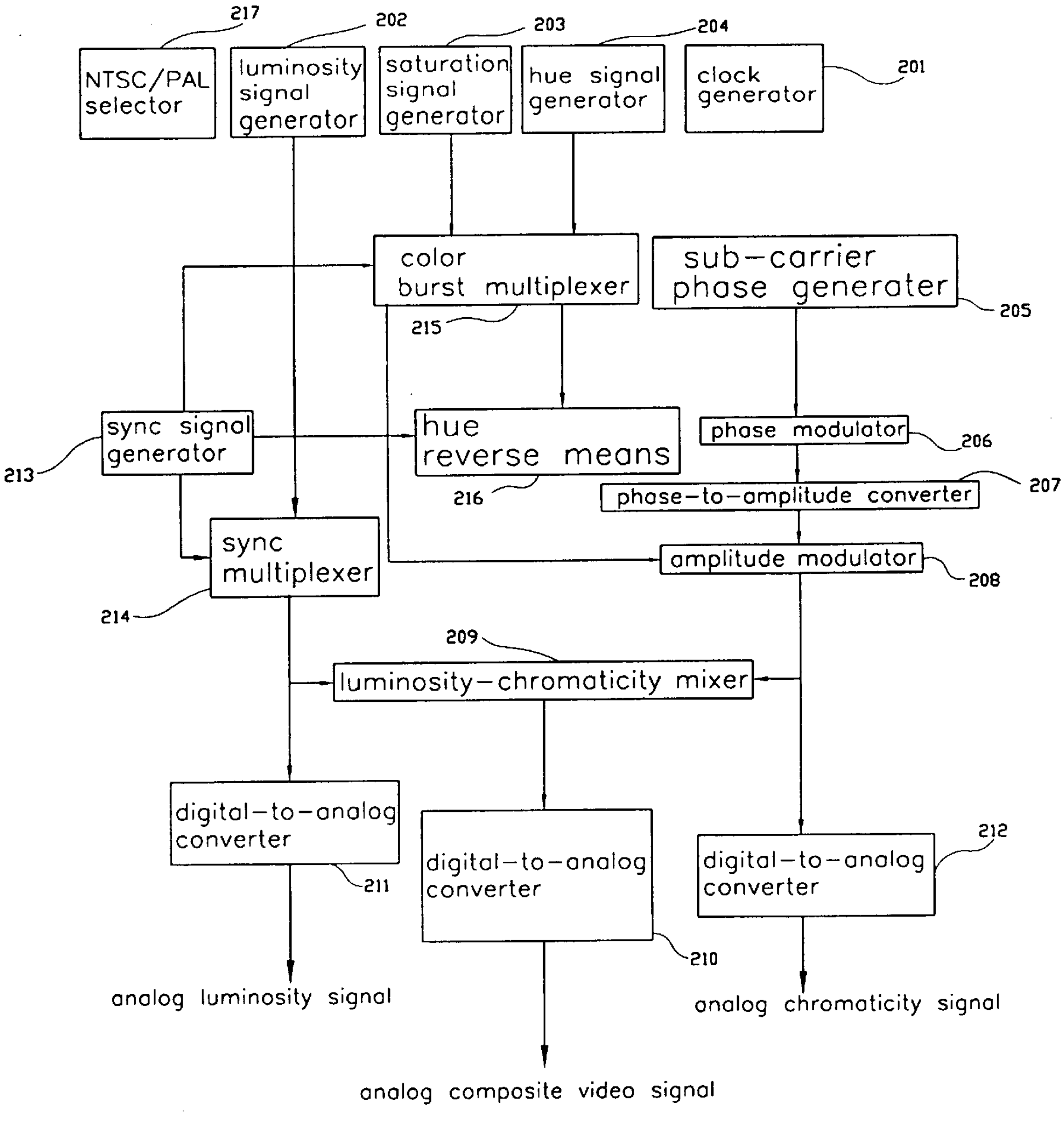
FIG. 4 shows a block diagram of the color video encoder of the present invention.

The color video encoder of the present invention is a digital encoder for converting color information including luminosity, saturation and hue as well as a sync timing signals to analog video signals that can support NTSC or PAL standard video format. With reference to FIG. 4, the color video encoder comprises a clock generator 201, a luminosity signal generator 202, a saturation signal generator 203 and a hue signal generator 204.

The clock generator 201 generates a a clock signal which has a frequency being a multiple of the frequency of color sub-carrier. The color sub-carrier frequency in NTSC standard is 3.579545 MHz, and that in PAL standard is 4.43361875 MHz. In an implementation shown later, the clock frequency for NTSC system is 21.47727 MHz. This frequency is equivalent to 6 times of the color sub-carrier frequency in NTSC standard. The clock frequency for PAL system is 21.28137 MHz. This frequency is equivalent to 4.8 times of the color sub-carrier frequency in PAL standard. Thus, the clock frequency for NTSC system and PAL system is nearly equal. Therefore, the video encoder can support both NTSC and PAL system. However, the clock oscillator cannot be compatible for both system in this system. The frequency of the clock signal can be 13.5 MHz defined in CCIR601. This frequency is equivalent to 132/35 times of the color sub-carrier frequency in NTSC standard and 216000/709379 times of that in PAL standard. In this case, one clock oscillator can support both system.

The luminosity signal generator 202, saturation signal generator 203 and the hue signal generator 204 generate digital luminosity signal, digital saturation signal and digital hue signal of the color information respectively.

The color video encoder also comprises a sub-carrier phase generator 205 for generating a digital sub-carrier phase signal that represents the phase angle of color sub-carrier wave. In the preferred embodiment of this invention, the sub-carrier phase generator generates a phase signal instead of a amplitude signal used in conventional video encoders. Very accurate digital phase signal can be generated for each clock cycle. This invention allows more color phases than the conventional approach.

The sub-carrier phase generator 205 can be implemented by M-based counter. It can generate a phase signal having N/M times of the clock signal by increasing N counts per every clock cycle. Because M corresponds to 360 degrees, the phase angle is represented by multiplying the count value with 360 degrees/M.

In a phase modulator 206, the digital sub-carrier phase signal from the sub-carrier phase generator 205 is phase-modulated by hue signal sent from hue reverse means 216. After modulation, the digital sub-carrier phase signal becomes a modulated digital phase signal. In the conventional encoder such as described in Japan Patent 2-50477, a number of phase signals each corresponding to hue to be generated are first generated. A phase signal is then selected for representing a desired hue.

The disadvantage of the conventional approach is that the number of phase signals has to increase as the number of hue increases. In order to generate more phase signals, the frequency of the timing clock has to increase too. In this invention, in order to generate many numbers of hue, the original sub-carrier phase signal is phase-modulated by hue signal. The phase modulator can be accomplished by a digital adder, because phase signal is represented by a digital value as stated above. Therefore the number of hue depends on the resolution of the digital calculation.

The modulated digital phase signal is converted to a modulated digital amplitude signal by a phase-to-amplitude converter 207. In the conventional encoder of Japan Patent 2-50477, color sub-carrier waveform is represented by a two-value square wave. The number of hue is determined by the multiple of the clock signal frequency to the sub-carrier frequency. In this invention, the modulated digital amplitude signal is represented by a multi-level wave. It is possible to achieve more hue than the multiple of the clock signal frequency to the sub-carrier frequency. In an implementation that is shown later, it has 2~2.5 times more hue signals.

It is important to note that the phase-to-amplitude converter 207 should have an appropriate conversion table so that each amplitude signal having different phase can generate clear phase difference each other and constant signal power.

The color video encoder also comprises a sync signal generator 213 a sync multiplexer 214 and a color burst multiplexer 215. The sync signal generator 213 generates a sync signal, a color burst flag signal and a line alternate signal The sync multiplexer 214 multiplexes the digital luminosity signal with the sync signal. The color burst multiplexer 215 generates digital color burst phase signal and digital color burst amplitude signal. And it also multiplexes the digital hue signal with the digital color burst phase signal, the digital saturation signal with the digital color burst amplitude signal according to the color burst flag signal. The multiplexed hue signal is further phase-reversed by the hue reverse means 216 according to the line alternate signal.

The modulated digital amplitude signal from the phase-to-amplitude converter 207 is further amplitude-modulated by the multiplexed saturation signal in an amplitude modulator 208. The output is a digital chromaticity signal. Saturation is less sensitive than hue and luminosity for human eyes. Therefore, the amplitude modulation can be implemented with a digital multiplier having a small number of bits.

The multiplexed luminosity signal from the sync multiplexer 214 is mixed with the digital chromaticity signal by a luminosity-chromaticity mixer 209 into a digital composite video signal. The digital chromaticity signal, the multiplexed luminosity signal and the digital composite video signal are converted to analog signals using respective digital-to-analog converters 212, 211 and 210.

According to NTSC/PAL select input, a NTSC/PAL selector 217 controls sub-carrier frequency in the sub-carrier phase generator 205, and also controls the phase and amplitude level of color burst in the color burst multiplexer 215. And it also enables and disables the line alternate function in the hue reverse means 216.

The color video encoder of this invention uses a polar coordinate system instead of an orthogonal coordinate system. In a conventional encoder, the color difference, IQ and UV inputs are orthogonal. These signals are amplitude-modulated by sine and cosine waves of the color sub-carrier respectively and then mixed to be a chromaticity signal Therefore, two multipliers that take large circuit size are required for the two amplitude modulators.

In this invention, instead of the two amplitude modulators, one phase modulator and one amplitude modulator are required. As mentioned above, the phase modulator can be implemented by an digital adder. The circuit size of it is quite smaller than a digital multiplier. And the amplitude modulator can be implemented by a digital multiplier having a small number of bits. That is because the amplitude modulator handles saturation that is less sensitive for human eyes. Therefore, it also takes a small circuit size.

In addition, inconsistent gradation is often seen when a shading operation in single hue is done for a color represented in an orthogonal coordinate system because of quantization noise. In this invention, the color is represented in a polar coordinate system, inconsistent gradation does not occur when a shading operation is done. Therefore, images can be shown with faithful colors.

The input signal to a traditional encoder consists of RGB signals. The luminosity signal and the hue signal have to be separated by a matrix circuit. The encoder of this invention takes hue, saturation and luminosity signals instead of RGB signals. The matrix circuit is not necessary.

In this invention the phase modulation in the phase modulator 206 is implemented by the adder. And the phase-to-amplitude converter 207 employs a conversion table. In order to avoid using a phase wrapping circuit, the conversion table should support more than 360 degrees. As an example, a phase wrapping would make the sum of 350 degrees and 20 degrees to 10 degrees. This invention computes the sum directly to get 370 degrees. The conversion table of the invention generates the same results for both 10 degrees and 370 degrees. On a semiconductor chip, ROM that stores the conversion table takes much smaller device area compared to a phase wrapping circuit that requires arithmetic operation circuit.

The interference between luminosity and chromaticity can be reduced by using analog filters after separating the signal into Y which is the analog multiplexed luminosity signal and C which is the analog chromaticity signal. The Y output signal can be filtered with a notch filter that blocks the sub-carrier frequency band to remove the the sub-carrier frequency band. The C output signal can be filtered with a band-pass filter that passes the sub-carrier frequency band to remove the signals outside the sub-carrier frequency band. Therefore, the interference can be removed.

Figure 5:
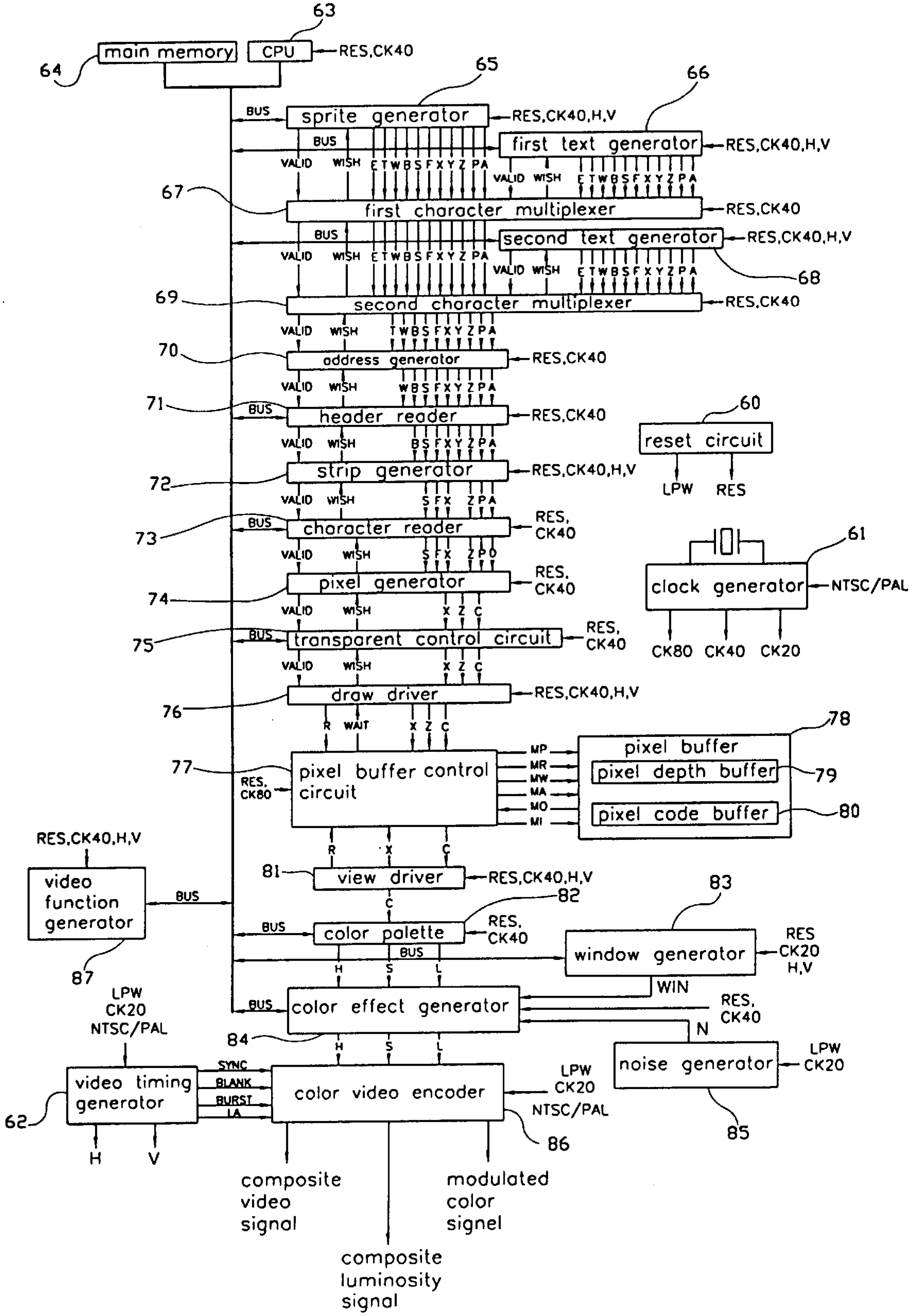
FIG. 5 shows a detailed circuit block diagram of a preferred embodiment for the color graphics processor of this invention.

A detailed circuit block diagram for a preferred embodiment of the color graphics processor of this invention is now described. FIG. 5 shows the circuit block diagram which can be implemented as a part of single semiconductor chip. A reset circuit 60 initializes or resets the whole circuit including the color graphics processor. It has two output signals. One is a low power warning signal LPW and the other is a reset signal RES. The signal LPW and the reset signal RES become active at the same time when the system power voltage is lower than defined voltage. When the system voltage is higher than the defined voltage, in order to protect a back-up memory, the signal LPW keeps active after the reset signal RES becomes active. The reset signal RES becomes active according to reset input.

A clock generator 61 generates clock signals by means of a PLL (phase locked loop) based on the fundamental frequency of a crystal oscillator. The frequency of the crystal oscillator should be derived from color sub-carrier frequency. In this embodiment, the frequency of the crystal oscillator is 3.579545 MHz for NTSC system, and 4.43361875 MHz for PAL system. Both of them equal to color sub-carrier frequency respectively.

By changing the ratio of the clock frequency to the crystal oscillator frequency, the clock frequency can be approximately same for NTSC and PAL system. In this case, pixel frequency can also be approximately same because both frequency of horizontal scan line is approximately same. It is convenient to get same system performance. In this embodiment, the frequency of a clock signal CK80 can be 96/4 times of the color sub-carrier frequency in NTSC standard or 96/5 times of the color sub-carrier frequency in PAL standard. The frequency of the clock signal CK80 is further divided by 2 or 4 to become two other clock signals CK40 and CK20 respectively.

Based on the clock signal CK20, a video timing generator 62 generates horizontal scanning position H[11], vertical scanning position V[9], sync signal SYNC, blanking signal BLANK, color burst flag signal BURST and line alternate signal LA. The number shown in [ ] as in H[11] represents the number of bits in the signal. The video timing generator 62 provides the function of the scanning position generator 2 in FIG. 2.

The horizontal and vertical frequency of these signals depend on NTSC or PAL system. For NTSC system, 1 horizontal cycle consists of 1365 cycles of the CK20, and 1 vertical cycle consists of 263 horizontal cycles. For PAL system, 1 horizontal cycle consists of 1362 cycles of the CK20, and 1 vertical cycle consists of 314 horizontal cycles. In order to avoid vertical vibration, non-interlace scan method is employed. In other words, the non-interlace scan method is called progressive scan method. Therefore, the generated video signals are not exactly based on NTSC/PAL standards.

The specification of color sub-carrier interleave is very close to NTSC/PAL standards. For NTSC system, the line interleave and frame interleave are both 180 degrees. For PAL system, the line interleave is 270 degrees The frame interleave is 180 degrees, namely it is different from the PAL standard. It is to reduce the dot interference between color sub-carrier and luminosity in the non-interlace scan method.

The scanning position (H, V) scans from the upper left corner (0, 16) to the lower right corner (1023, 239) on the screen. (H, V) means the value of horizontal and vertical scanning position signals generated by the video timing generator 62. A pixel position is identified with the higher 9 bits of H and all bits of V. The whole display screen consists of a 256×224 two dimensional pixel array. In other words, there are 224 displayed horizontal scan lines and each scan line has 256 pixels. There is a little gap between the scanning position signals and signals SYNC, BURST and LA to solve delay that happens in pipeline processing.

CPU 63 that provides the function of the control means 11 of FIG. 2 is an 8-bit microprocessor. It accesses data stored in memory and registers through a bus. The CPU 63 also connects to address lines, data lines and control lines through respective buses. Main memory 64 stores programs and data as well as character structures. It is also connected to the bus.

Sprite generator 65 provides the function of the sprite generator 5 and object limiting means 7 in FIG. 2. The sprite generator 65 includes sprite control registers and sprite local memory. The CPU 63 can access the sprite control registers and the sprite local memory through the bus. The sprite control registers stores character pointer format T[3] and attribute mode W. The sprite local memory stores number of bits per pixel B[3], character size S[2], character flip control F[2], character horizontal position X[9], character vertical position Y[5], character depth value Z[4], palette select code P[4] and character pointer A[24]. The character pointer points to location of a character structure in the main memory 64.

The sprite generator 65 sequentially loads each sprite information from the sprite local memory and determines if a read sprite location overlaps with a portion of the picture screen corresponding to the current position of the pixel buffer 78 or not according to the scanning position H[11] and V[9]. Then the sprite generator 65 outputs signals T[3], W, B[3], S[2], F[2], X[9], Y[5], Z[4], P[4] and A[24] of the overlapping sprites. It also outputs a signal VALID to the next stage and inputs a signal WISH from the next stage. The behavior of the sprite generator 65 is synchronized with the clock signal CK40 and reset by the reset signal RES.

Function blocks composing a graphic processing pipeline have handshake signals VALID and WISH to send data to the next function block. The sender outputs signal VALID to the receiver and the sender asserts this signal while the data to be sent are ready. The receiver outputs signal WISH to the sender and the receiver asserts this signal while the data can be received. The data is sent during one clock cycle while both signals VALID and WISH are asserted.

The first text generator 66 includes text control registers that CPU can access. The text control registers store text array pointers TL[8], TH[8], TA[8], character pointer format T[3], attribute mode W[2], number of bits per pixel B[3], character size S[2], character flip control F[2], character depth value Z[4], palette select code P[4], text screen horizontal position TX[8] and text screen vertical position TY[8]. These B[3], S[2], F[2], Z[4] and P[4] are applied to all characters composing the first text screen.

The text generator 66 accesses the text arrays stored in the main memory 64 according to text array pointers TL[8], TH[8] and TA[8]. The text arrays stores palette select code P[4], character depth value Z[4] and character pointer A[24] of all characters composing the first text screen. If the lower bit of W[2] is active, these P[4] and Z[4] become effective and those P[4] and Z[4] in text control registers are ignored. The lower bit of W[2] is no longer needed in the next stage, therefore it is cast off in the text generator 66.

The text generator 66 reads the character information from the text arrays according to the scanning position H[11] and V[9]. And it also generates character horizontal position X[9] and character vertical position Y[5] according to the character's position in the text arrays and the text screen position TX[8] and TY[8]. Then it outputs the character information to the next stage.

If the value of the character pointer A[24] equals to zero, it indicates that the character is transparent. Information of the transparent characters is not sent out. Signals that are sent to the next stage by the first text generator 66 include VALID, T[3], W(higher bit), B[3], S[2], F[2], X[9], Y[5], Z[4], P[4], A[24] and an emergency signal E. The signal WISH is an input to the first character generator 66 from its next stage.

The emergency signal E becomes active for urging the next stage to receive data while the difference between position of the last sent character and the scanning position indicates more than certain value. The behavior of the first text generator 66 is synchronized with the clock signal CK40 and reset by the reset signal RES.

A first character multiplexer 67 that provides the function of the object selector 6 in FIG. 2 multiplexes sprite character information and first text character information. In general, sprite character information has higher priority for been selected. However, when the emergency signal E sent from the first text generator 66 is active, first text character information has higher priority.

The input signals to the first character multiplexer 67 are VALID, T[3], W, B[3], S[2], F[2], X[9], Y[5], Z[4], P[4] and A[24] from the sprite generator 65 and VALID, T[3], W, B[3], S[2], F[2], X[9], Y[5], Z[4], P[4], A[24] and the emergency signal E from the first text generator. The first character multiplexer 67 has output signals WISH to both the sprite generator 65 and the first text generator 66. The output signals of first character multiplexer 67 to the next stage are VALID, T[3], W, B[3], S[2], F[2], X[9], Y[5], Z[4], P[4] and A[24]. It also receives a signal WISH from the next stage. The behavior of the first character multiplexer is synchronized with the clock signal CK40 and reset by the reset signal RES.

For some purposes such as imitating background graphics having depth, there are two text generators 66 and 68. The structure and input/output signals of the second text generator 68 are identical to that of the first text generator 66 except that the assigned address of the text control registers is different.

The second character multiplexer 69 multiplexes second text character information and character information sent from the first character multiplexer 67. In general, the character information sent from the first character multiplexer 67 has higher priority. However, when the emergency signal E sent from the second text generator 66 is active, second text character information has higher priority.

The address generator 70 that provides the function of the character pointer format converter 8 of FIG. 2 converts the character pointer A[24] to the real address pointer according to the character pointer format T[3] sent from the preceding stage. It comprises a 16×16 bit segment memory that can be accessed by the CPU 63. The segment memory stores the segment address and the base address used for the address conversion.

There are five types of character pointer formats. They are 8 bit character number, 16 bit character number, 16 bit pointer with lower bits alignment, 16 bit address pointer and 24 bit address pointer.

In 8 bit and 16 bit character number format, the value of A represents a character number. The address generator 70 computes the number of one character structure bytes according to B[3] and S[2], and then generates the real address pointer. The number of one character structure bytes is computed by the following formula:

[Number of a character structure bytes]

$$= [\text{Number of bits per pixel } (1 \sim 8)] \times [\text{Horizontal character size } (8/16)] \times [\text{Vertical character size } (8/16)]/8$$

In 16 bit pointer with lower bits alignment format, the lower 13 bits of the A[16] become upper 13 bits of 16 bit offset address. The lower 3 bits of the 16 bit offset address are always zero. The address generator adds the 16 bit offset address to 24 bit base address for generating 24 bit real address pointer. The upper 16 bits of the 24 bit base address is stored in the segment memory. The upper 3 bits of A[16] select one of base address in the segment memory. The lower 8 bits of the base address is always zero.

In 16 bit address pointer format, the lower 12 bits of the A[16] become 12 bit offset address. The address generator adds the 12 bit offset address with 24 bit segment address. The upper 16 bits of the 24 bit segment address are stored in the segment memory. The upper 4 bits of A[16] selects one of segment address. The lower 8 bits of the segment address are always zero.

In 24 bit address pointer format, A[24] represents 24 bit real address pointer directly. No conversion happens.

The computed real address pointer A[24] and other information are sent to the next stage for further processing. The character pointer format T[3] is dropped because it is no longer needed. The behavior of the address generator 70 is synchronized with the clock signal CK40 and reset by the reset signal RES.

A header reader 71 reads the character header in the character structure. There are two types of character structure. One has a character header but the other has no character header. It is indicated by the attribute mode W. The character data structure having character header consists of at least one byte of character header and character pattern data. The character data structure having no character header consists of only character pattern data.

The last character header byte that precedes the character pattern data contains palette control code P[4], number of bits per pixel B[3] and a header termination bit that indicates the end of character header. Other character header bytes contain palette control code P[4], character flip control F[2], a header termination bit and a header skip bit that indicates either the next fetched character header is the following byte or the next of the following byte. The header termination bits are inactive except the last character header byte.

The real address pointer A[24] sent from the preceding stage may point any byte in a character header. If the last character header byte is pointed, the palette control code P[4] and the number of bits per pixel B[3] that are stored in the last header become effective. And character flip control F[2] is filled with zero. If the other character header byte is pointed, palette control code P[4] and character flip control F[2] that are stored in the pointed header become effective. And number of bits per pixel B[3] stored in the last header become effective.

If the attribute mode W indicates active, P[4], F[2] and B[3] in character header become effective, and identical information sent from the preceding stage are ignored. And the header reader converts the real address pointer A[24] pointing to a header to address pointer A[24] pointing to the top of the character pattern data. The behavior of the header reader 71 is synchronized with the clock signal 40 and reset by the reset signal RES.

A strip generator 72 generates a one dimensional horizontal character strip from the two-dimensional character pattern. The strip generator 72 converts the address pointer A[24] pointing to the top of character pattern data to address pointer A[24] pointing to the top of the character strip according to the character vertical position Y[5], the character flip control F[2], the number of bits per pixel B[3], character size S[2] and the scanning position H[11] and V[9]. The A[24], Y[5], F[2], B[3] and S[2] are sent from the preceding stage, and H[11] and V[9] are sent from the video timing generator 62.

The information of the vertical character size, the vertical character flip control and vertical character position is no longer needed. One bit of S[2] represents the vertical character size and one bit of F[2] represents the vertical character flip control. Therefore, S[2] and F[2] become S[1] and F[1]. And Y[8] is not transmitted further. The input signals to the strip generator 72 from the preceding stage are VALID, B[3], S[2], F[2], X[9], Y[8], Z[4], P[4] and A[24]. The strip generator 72 sends a signal WISH back to the preceding stage. The output signals of the strip generator 72 to the next stage are VALID, B[3], S[1], F[1], X[9], Z[4], P[4] and A[24]. The behavior of the strip generator is synchronized with the clock signal CK40 and reset by the reset signal RES.

The character reader 73 reads the character pattern data from the main memory 64 according to the address pointer A[24] sent from the preceding stage. Then it outputs the read character pattern data D[8] with other input information together.

The input signals to the character reader from the preceding stage are are VALID, B[3], S[1], F[1], X[9], Z[4], P[4] and A[24]. The character reader 73 also sends a signal WISH back to the preceding stage. The output signals to the next stage are VALID, B[3], S[1], F[1], X[9], Z[4], P[4] and D[8]. The behavior of the character reader is synchronized with the clock signal CK40 and reset by the reset signal RES.

A pixel generator 74 generates pixel color code of each pixel. It makes an array by reordering the sent character pattern data D[8] in little endian way. Then it cuts the array by the number of bits per pixel (1–8 bits) represented by B[3] in order to form pixel color code C[8]. The lower bits of the C[8] is filled with the cut pixel data (1–8 bits). In case of the number of bits per pixel equals to from 1 to 7, upper blank bits of the C[8] are filled with upper bits of the palette control code P[4]. In case of the number of bits per pixel equals to from 1 to 3, still remaining blank bits are filled with zero.

The pixel generator also generates pixel horizontal position X[9] for each pixel according to character horizontal position X[9] sent from the preceding stage and character flip control F[1]. This F [1] controls horizontal flip of the character. If the F[1] is active, the generated X[9] is reversed in horizontal direction. The B[3], F[1], P[4] and character size S[1] are no longer needed in the next stage.

The input signals to the pixel generator 74 from the preceding stage are VALID, B[3], S[1], F[1], X[9], Z[4], P[4] and D[8]. The pixel generator 74 also sends a signal WISH back to the preceding stage. The output signals to the next stage are VALID, X[9], Z[4] and C[8]. The behavior of the pixel generator 74 is synchronized with the clock signal CK40 and reset by the reset signal RES. The strip generator 72, the character reader 73 and the pixel generator 74 accomplish the function of the pixel generator 10 of FIG. 2.

A transparent control circuit 75 provides the functions of both transparent information storage means 12 and transparent control means 13 of FIG. 2. It comprises 16 rows×5 bits of transparent control memory that can be accessed by the CPU 63. The color palette memory has a structure containing 16 rows×16 columns×13 bits. Only one color in each row of the color palette memory can be transparent color.

If the color information that the CPU 63 writes into the color palette memory is a transparent color, 4 bits of the transparent control memory word that is located in the same row address stores the column address of the color palette memory, and the remaining 1 bit becomes active. This bit indicates enable/disable of transparent control. If the CPU writes a non-transparent color into the identical word of the color palette, this bit becomes inactive.

The pixel color code C[8] that is sent from the preceding stage indicates the address of the color palette memory. In advance, the transparent control circuit detects pixel having a transparent color. The upper 4 bits of C[8] selects a row of the transparent control memory, and lower 4 bits of C[8] is compared with 4 bits of the transparent memory word. If they are identical and the remaining one bit of the transparent memory word is active, the C[8] indicates a transparent color. Then all pixel information including this C[8] are cast off in the transparent control circuit and no longer transmitted to the next stage. The input signals to the transparent control circuit 75 from the preceding stage are VALID, X[9], Z[4] and C[8]. The transparent control circuit also sends a signal WISH back to the preceding stage. The output signals of the transparent control circuit are VALID, X[9], Z[4] and C[8]. The behavior of the transparent control circuit is synchronized with the clock CK40 and reset by the reset signal RES.

The horizontal position X[9] of the pixel information and the horizontal scanning position H[11] are examined by the draw driver 76 to see if the pixel overlaps with the pixel buffer 78. Only overlapped pixels are drawn into the pixel buffer 78. The upper 2 bits of X[9] is no need to point to a pixel buffer unit. They are cast off in the draw driver. The input signals to the draw driver 76 from the preceding stage are VALID, X[9], Z[4] and C[8]. The draw driver also sends a signal WISH back to the preceding stage. The output signals to the next stage are request signal R, X[7], Z[4] and C[8]. The input signal from the next stage is a signal WAIT. The draw driver 76 provides the functions of pixel limiting means 14 and pixel drawing means 15 of FIG. 2. The behavior of the draw driver is synchronized with the clock signal CK40 and reset by the reset signal RES.

A pixel buffer control circuit 77 arbitrates between the request signal R from the draw driver 76 and another request signal R from a view driver 81. The request signal from the view driver 81 has higher priority. Timing signals of three periods (pre-charge signal, read signal, and write signal) are generated with 80 MHz clock signal for driving the pixel buffer 78 after the request signals have been arbitrated.

When the request from the draw driver is granted, the depth value is read from the target pixel buffer unit, then it is compared with the pixel depth value Z[4] sent from the draw driver. If the Z[4] is larger, the pixel color code C[8] is written into the target pixel buffer unit. When the request from the view driver is granted, the pixel color code is read from the target pixel buffer unit, then the depth value and the pixel color code of the target pixel buffer unit are initialized to zero values.

The input signals from the draw driver are R, X[7], Z[4] and C[8] and the signal WAIT is sent back to the draw driver. The input signals from the view driver are R and pixel buffer address X[7] and output signal to the view driver is the pixel color code C[8]. The output signals to the pixel buffer 78 are pre-charge control signal MP, read control signal MR, write control signal MW, pixel buffer address MA[7] and write data MI[12], and input signal from the pixel buffer is read data MO[12]. The pixel buffer control circuit 77 provides functions of buffer arbitrator 20 and buffer access accelerator 24 of FIG. 2. The behavior of the pixel buffer control circuit is synchronized with the clock signal CK80 and reset by the reset signal RES.

The pixel buffer 78 comprises pixel depth buffer 79 and pixel code buffer 80. There are 128 pixel buffer units and each unit comprises 4 bits of a depth buffer unit and 8 bits of a pixel code buffer unit. The input signals from the pixel buffer control circuit 77 are MP, MR, MW, MA[7] and MI[12]. The output signal to the pixel butter control circuit 77 is MO[12].

The view driver 81 requests the pixel buffer control circuit 77 to read pixel color code C[8] from the pixel buffer 78 according to the scanning position H[11] and V[9]. The output signals of the vie driver to the pixel buffer control circuit 77 are request signal R and pixel buffer address X[7]. The wait signal is not sent from the pixel buffer control circuit because the access of the view driver has higher priority. The input signal from the pixel buffer control circuit 77 is pixel color code C[8]. This C[8] is synchronized with the pixel timing clock and then sent to the next stage. The frequency of the pixel timing clock is approx. 5 MHz that is a quarter of the frequency of the clock signal CK20. The behavior of the view driver is synchronized with the clock signal CK40 and reset by the reset signal RES.

A color palette 82 comprises 256×13 bits of color palette memory. The color palette memory is accessible from the CPU 63. It can store 13 bit color information for 256 colors. The pixel color code C[8] from the preceding stage are used as palette memory address to select the color information. The 13 bit information consists of hue signal H[5], saturation signal S[3] and luminosity signal L[5]. Hue signal is represented with an integer from 0 to 23. Saturation signal is represented with an integer from 0 to 7. The luminosity signal is represented with an integer from 0 to 23. If the value of hue written by the CPU 63 is between 23 to 31, it is considered transparent. The output signals of the color palette 82 to the next stage are H[5], S[3] and L[5]. The behavior of the color palette is synchronized with the clock signal CK40 and reset by the reset signal RES.

The display screen can be divided into two parts, and one of the parts can have a special color effect. This part is called a window mask. A window generator 83 controls the area of the window mask and a color effect generator 84 produces the special color effect. The window generator contains window control registers for setting a starting point and an end point as well as initial value of a signal WIN. The CPU 63 can access these registers. The signal WIN indicates whether the scanning position is in the window mask or not. The value of WIN is initialized with the initial value whenever the scanning position reaches left edge of the screen. When the horizontal scanning position matches the starting point, the signal WIN becomes active. When the horizontal scanning position matches the end point, the signal WIN becomes inactive. The window generator can generate an interrupt request for the CPU 63. The interrupt request occurs whenever the horizontal scanning position matches the starting point or the end point. Therefore, the CPU can changes the starting position and the end position dynamically to produce various shapes of window mask. The behavior of the window generator is synchronized with the clock signal CK40 and reset by the reset signal RES.

A noise generator 85 generates noise for one of special color effects produced by the color effect generator 84. The noise generator 85 generates digital random noise by means of an M-series polynomial counter. The output signal of the noise generator 85 is noise N[3] that is lower 3 bit value of the polynomial counter. The low power warning signal LPW resets the polynomial counter to avoid that the count value circulates in an abnormal loop. The behavior of the noise generator is synchronized with the clock signal CK20 and reset by the reset signal RES.

The color effect generator 84 produces various special color effects on the pixel color information sent from the color palette 82. The color effect is enabled or disabled by the signal WIN generated by the window generator 83. The color effect generator 84 comprises color effect registers that can be accessed by the CPU 63 for controlling the special color effect.

One of color effects is fixing hue signal H[5], saturation signal S[3] and luminosity signal L[5] to constant values. The color effect registers store control flags to enable or disable this fixing effect independently for each color information. And the color effect registers also store constant values for each color information.

Another color effect is reducing saturation signal S[3] and luminosity signal L[5] to half. The color effect registers also store a control flag to enable or disable this reducing effect.

Another color effect is reversing the polarity of color such as a positive to a negative. The reversed hue is computed by adding original hue H[5] to 12. If the sum is over 23, 24 is subtracted from the sum. The reversed luminosity is computed by subtracting original luminosity L[5] from 23. Saturation is no need to be reversed. The color effect registers also store a control flag to enable or disable this reverse effect.

Another color effect is adding noise on the color. The lower 3 bits of the luminosity L[3] can be logically XORed with the noise N[3] sent from the noise generator 85. The color effect registers also store control flags to enable or disable the XOR independently for each bit in order to control noise level. The behavior of the color effect generator is synchronized with the clock signal CK40 and reset by the reset signal RES.

Video function generator 87 notifies the CPU 63 of the beginning of every vertical blanking period by sending interrupt to the CPU according to the scanning position H[11] and V[9]. It also has a mechanism to send interrupt request to the CPU at the specified position on the screen. The video function generator 87 has registers accessible from the CPU 63. These registers store information of the specified horizontal and vertical position. Interrupt request to the CPU occurs when the scanning position reaches at the specified position. The interrupts can be disabled or enabled by the CPU 63.

Figure 6:
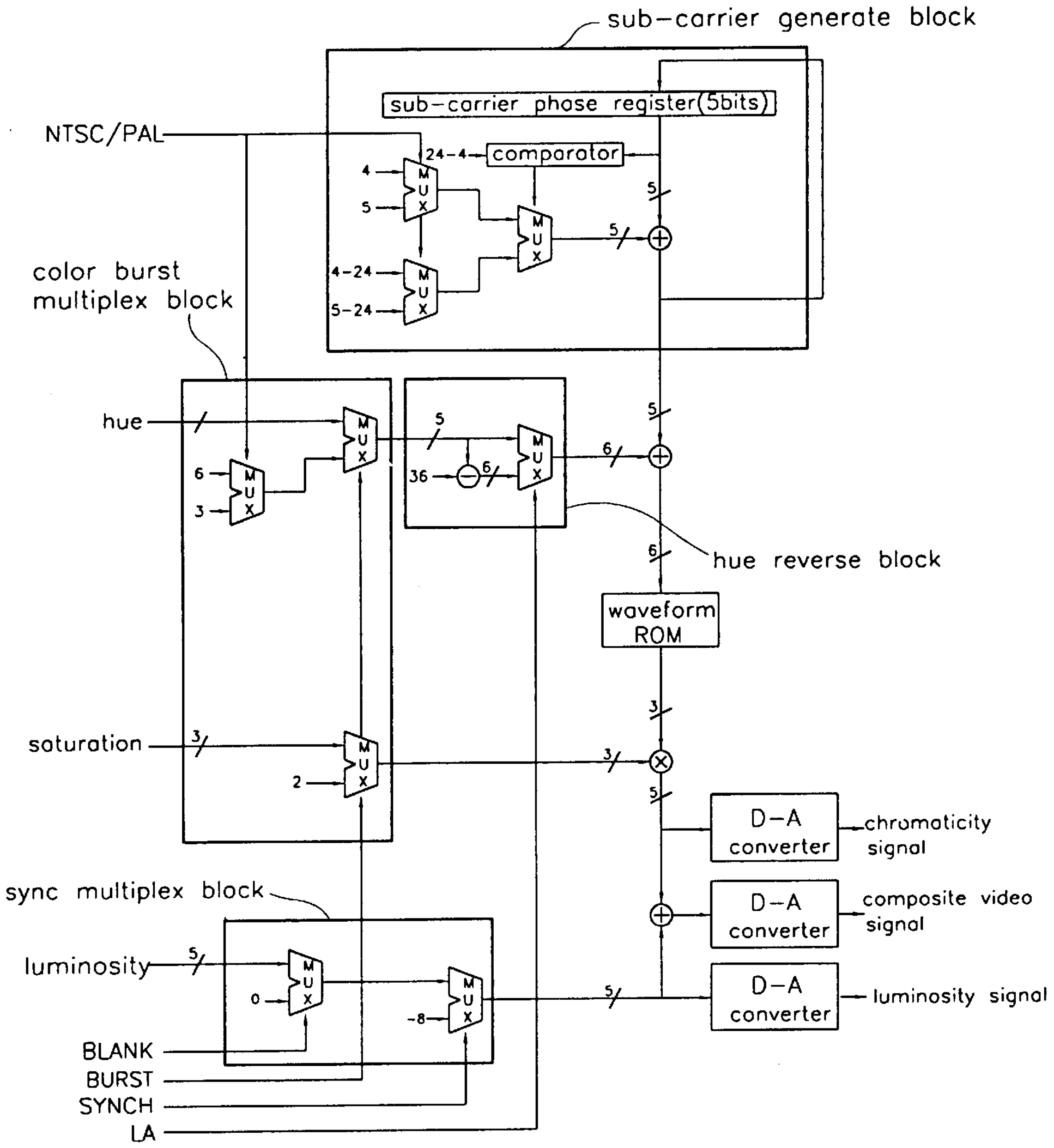
FIG. 6 shows a detailed circuit block diagram of the color video encoder used in the color graphics processor of this invention.

FIG. 6 shows a a detailed circuit block diagram of the color video encoder 86. The behavior of the color video encoder is synchronized with the clock signal CK20 with a frequency that is 6 times of the sub-carrier frequency in an NTSC standard or 4.8 times of the sub-carrier frequency in a PAL standard. In NTSC system, it is 21.47727 MHz. In PAL system, it is 21.28137 MHz.

A 5-bit counter for representing sub-carrier phase is used for generating the sub-carrier phase signal. The count value increases by 4 in NTSC system or 5 in PAL system per every clock cycle. If the count value is greater 20, it decreases 20 in NTSC system or 19 in PAL system not to over 24.

In NTSC system, if the lower two bits of the count value are not zero, 5 is added to make the lower two bits close to zero. The purpose of this operation is to generate the phase signal having same value circulation in spite of any initial value of the counter. The count value is between 0 to 24.

The hue signal H[5] is multiplexed with color burst phase in the color burst multiplex block in FIG. 6. The color burst phase is selected while the signal BURST is active. The value of the color burst phase is 6 in NTSC or 3 in PAL. The phase value 6 and 3 represent 180 degrees and 135 degrees respectively. Phase angle of the multiplexed hue signal is reversed in the hue reverse block in FIG. 6 while the signal LA is active. The origin of the reverse is the phase value 18 representing 0 degree. Therefore, the value 0~23 is converted to 36~13. Here, the multiplexed hue signal requires 6 bit signal. This 6 bit multiplexed hue signal is added to the 5 bit sub-carrier phase signal and becomes 6 bit modulated phase signal.

The 6 bit modulated phase signal is converted by a waveform ROM into a 3 bit modulated amplitude signal. The waveform table is shown in FIG. 7. The converted waveforms are shown in FIGS. 8 and 9. In NTSC system, there are 4 patterns of waveform and the clock frequency is 6 times of the sub-carrier frequency. Therefore, 6×4=24 kinds of hue are available. In PAL system, the waveform circulates in 5 sub-carrier cycles and the clock frequency is 4.8 times of the sub-carrier frequency. Therefore, 5×4.8=24 kinds of hue are available.

The saturation signal S[3] is multiplexed with amplitude level of color burst in the color burst multiplex block. The amplitude level of color burst is selected while the signal BURST is active. The value of the amplitude level is 2 in NTSC and 1 in PAL.

The modulated amplitude signal is amplitude-modulated by the multiplexed saturation signal to become digital chromaticity signal. This amplitude modulation is done by a digital multiplier. The multiplier is implemented by a simple circuit. The input signals of the multiplier are one 3 bit value from −2 to 2 and another 3 bit value from 0 to 7. The output signal is 5 bit value from −14 to 14. The digital chromaticity signal is converted to an analog chromaticity signal by a digital-to-analog converter.

The luminosity signal L[5] is multiplexed with sync signals in sync multiplex block in FIG. 6. The luminosity signal is forced to value 0 while the signal BLANK is active. The luminosity signal is also forced to value −8 while the signal SYNC is active. The multiplexed luminosity signal is converted to an analog luminosity signal by a digital-to-analog converter.

Figure 10:
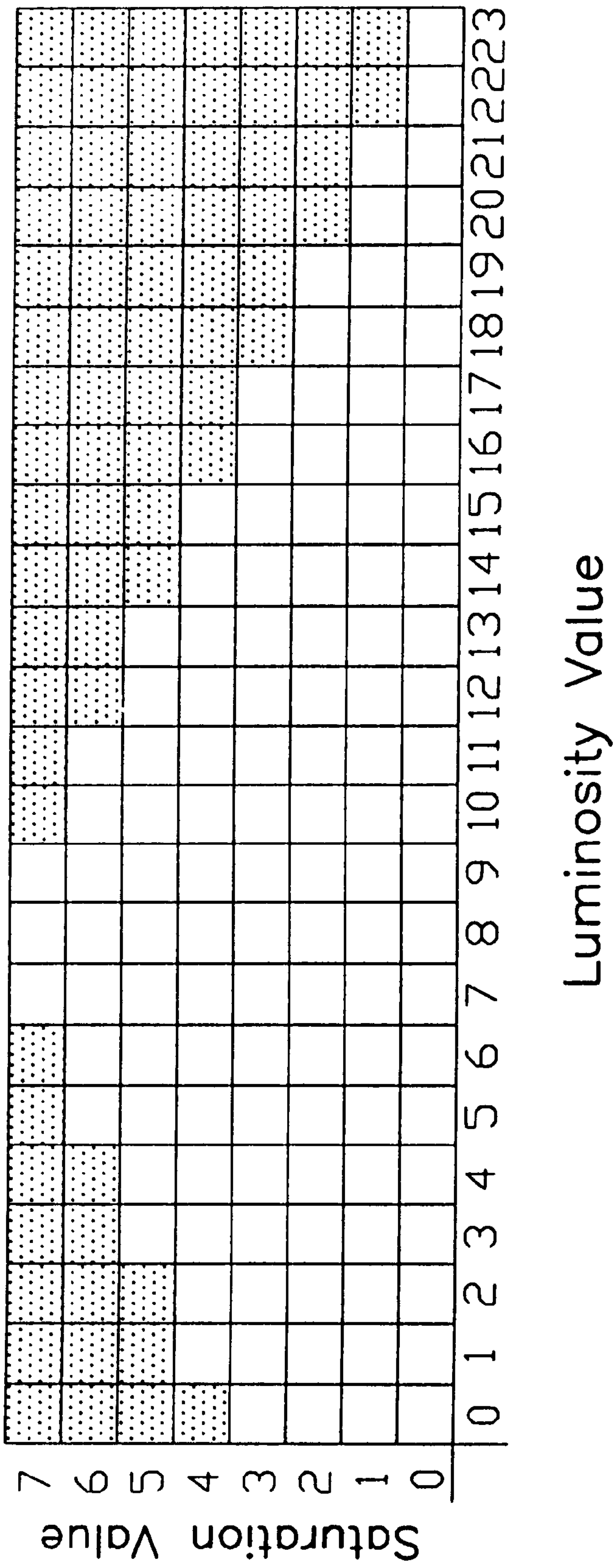
FIG. 10 illustrates the range of available combinations of the digital luminosity signal and the digital saturation signals for the color video encoder of the present invention.

The multiplexed luminosity signal is added with the digital chromaticity signal by a digital adder. In some combination of luminosity signal L[5] and saturation signal S[3], the adder overflows. The illegal combinations of luminosity and saturation are shown in FIG. 10. The shaded combinations are illegal. The added signal is converted to an analog composite video signal by a digital-to-analog converter.

As discussed above, the color video encoder only requires one multiplier and simple circuits. Therefore, it is easy to construct the color video encoder on single semiconductor chip. It can generate very rich colors. A low frequency timing clock can be used to get many color phases.

What is claimed is:

1. A scan image generator for generating a picture screen constructed by scanning a two-dimensional pixel array using a raster-scan approach, comprising:

a scanning position generator for generating a scanning position; and a plurality of pixel buffer units being organized as a circular pixel buffer having a pixel buffer unit storing pixel information of a current scanning position and other pixel buffer units sequentially storing pixel information of a plurality of scanning positions following the current scanning position;

a tail pointer for said circular pixel buffer, said tail pointer pointing to the pixel buffer unit storing pixel information of the current scanning position;

a head pointer for said circular pixel buffer, said head pointer pointing to a pixel buffer unit newly freed for storing pixel information of a future scanning position;

wherein the current scanning position moves sequentially, and when said current scanning position moves from a first scanning position to a second scanning position, the pixel buffer unit storing the first scanning position is freed, the tail pointer is updated for pointing to the pixel buffer unit storing the second scanning position, and the head pointer is updated for pointing to the newly freed pixel buffer unit.

2. The scan image generator according to claim 1, wherein the number of said plurality of pixel buffer units is less than the number of pixels in one horizontal scan line on the picture screen.

3. The scan image generator according to claim 1, further comprising:

a character data structure including character pattern data for representing a two-dimensional pixel array and at least one set of character attribute data for characterizing said character pattern data;

a character pointer for accessing said character data structure; and a header fetching means for fetching said character attribute data according to said character pointer and generating a character pattern data pointer, said character attribute data and said character pattern data pointer being the output of said header fetching means.

4. The scan image generator according to claim 3, further comprising a character pointer converter for converting character pointers in a plurality of formats to character pointers in a unified format according to the information of the respective formats of character pointers.

5. A color graphics processor for generating a picture screen constructed by scanning a two-dimensional pixel array using a raster-scan approach, comprising:

a clock generator for generating a clock signal;

a scanning position generator for generating a scanning position according to said clock signal;

an object generator for generating graphic objects;

a pixel generator for decomposing graphic objects into pixels, and generating pixel information including a pixel color code, a pixel depth value and a pixel position for each pixel;

a plurality of pixel buffer units being organized as a circular pixel buffer having a pixel buffer unit storing pixel information of a current scanning position and other pixel buffer units sequentially storing pixel information of a plurality of scanning positions following the current scanning position, each pixel buffer unit having a pixel depth buffer and a pixel code buffer for respectively storing the pixel depth value and the pixel color code of a pixel;

a tail pointer for said circular pixel buffer, said tail pointer pointing to the pixel buffer unit storing pixel information of the current scanning position;

a head pointer for said circular pixel buffer, said head pointer pointing to a pixel buffer unit newly freed for storing pixel information of a future scanning position;

a pixel drawing means for accessing said circular pixel buffer according to the scanning position from said scanning position generator and the pixel position from said pixel generator, comparing the pixel depth value of a pixel generated from said pixel generator with the pixel depth value read from the depth buffer of a corresponding pixel buffer unit, and updating the pixel color code and the pixel depth value of said corresponding pixel buffer unit based on the result of comparison;

a buffer output means for reading the pixel depth value and the pixel color code in the pixel buffer unit storing the pixel information of the current scanning position;

a buffer access arbitrator for arbitrating the access of said circular pixel buffer between said buffer output means and said pixel drawing means;

a palette means for converting said pixel color code to pixel color information to be displayed; and an output means for outputting said pixel color information;

wherein the current scanning position moves sequentially, and when said current scanning position moves from a first scanning position to a second scanning position, the pixel buffer unit storing the first scanning position is freed, the tail pointer is updated for pointing to the pixel buffer unit storing the second scanning position, and the head pointer is updated for pointing to the newly freed pixel buffer unit.

6. The color graphics processor according to claim 5, wherein the number of said plurality of pixel buffer units is less than the number of pixels in one horizontal scan line on the picture screen.

7. The color graphics processor according to claim 5, further comprising a pixel limiting means for determining whether the pixel information generated by said pixel generator overlaps with the portion of the picture screen corresponding to said circular pixel buffer or not in accordance with the scanning position generated by said scanning position generator, said pixel limiting means receiving pixel information from said pixel generator and outputting only overlapped pixel information to said pixel drawing means.

8. The color graphics processor according to claim 5, further comprising an object limiting means for determining whether the objects generated by said object generator overlap with the portion of picture screen corresponding to said circular pixel buffer or not in accordance with the scanning position generated by said scanning position generator; said object limiting means receiving objects from said object generator and outputting only overlapped objects to said pixel generator.

9. The color graphics processor according to claim 5, further comprising a buffer access accelerator for accelerating the access of said circular pixel buffer to three cycle access consisting of a pre-charge cycle, a read cycle, and a compare and write cycle, said read cycle and said write cycle being a pair of operations necessary for accessing said circular pixel buffer.

10. The color graphics processor according to claim 5, wherein said object generator further comprises:

a text generator for generating still graphic objects;

a sprite generator for generating motion graphic objects; and an object selector for selecting a still graphic object or a motion graphic object as the object generated by said object generator.

11. The color graphics processor according to claim 5, further comprising:

a sync signal generator for generating a sync signal according to the scanning position from said scanning position generator; and a video signal generator for converting said pixel color information and said sync signal to a composite video signal.

12. The color graphics processor according to claim 5, further comprising:

a control means;

a transparent information storage means for storing the address of a palette of said palette means if a pixel color code written into the palette by said control means is transparent; and a transparent control means having a pixel color code as input for accessing said transparent information storage, determining if the input pixel color code is transparent or not and transmitting the input color code that is not transparent to said pixel drawing means.

* * * * *